United States Patent
Zhang et al.

(10) Patent No.: US 11,409,287 B2
(45) Date of Patent: Aug. 9, 2022

(54) NEURAL TASK PLANNER FOR AUTONOMOUS VEHICLES

(71) Applicant: Baidu USA, LLC, Sunnyvale, CA (US)

(72) Inventors: Liangjun Zhang, Sunnyvale, CA (US); Jinxin Zhao, Sunnyvale, CA (US)

(73) Assignee: Baidu USA LLC, Sunnyvale, CA (US)

(*) Notice: Subject to any disclaimer, the term of this patent is extended or adjusted under 35 U.S.C. 154(b) by 167 days.

(21) Appl. No.: 16/746,777

(22) Filed: Jan. 17, 2020

(65) Prior Publication Data

US 2021/0223774 A1     Jul. 22, 2021

(51) Int. Cl.
  *G05D 1/00* (2006.01)
  *B60W 50/00* (2006.01)
  (Continued)

(52) U.S. Cl.
  CPC ........... *G05D 1/0088* (2013.01); *B60W 50/00* (2013.01); *G05B 13/027* (2013.01);
  (Continued)

(58) Field of Classification Search
  CPC .......... B60W 50/00; B60W 2050/0028; G05B 13/027; G05B 13/042; E02F 9/205;
  (Continued)

(56) References Cited

U.S. PATENT DOCUMENTS

| 6,076,030 A * | 6/2000 | Rowe | E02F 3/435 |
| | | | 172/4.5 |
| 2016/0078363 A1* | 3/2016 | Hodel | G06N 20/00 |
| | | | 706/12 |

(Continued)

FOREIGN PATENT DOCUMENTS

| JP | 4293404 B2 | 7/2009 |
| JP | 2018147261 A | 9/2018 |
| WO | 2018211141 A1 | 11/2018 |

OTHER PUBLICATIONS

European Search Report dated Mar. 24, 2021, in European Patent Application No. EP 20 19 5356, dated Apr. 9, 2021. (17 pgs).

(Continued)

*Primary Examiner* — Elaine Gort
*Assistant Examiner* — Ellis B. Ramirez
(74) *Attorney, Agent, or Firm* — North Weber & Baugh LLP

(57) ABSTRACT

Described herein are embodiments of a neural network-based task planner (TaskNet) for autonomous vehicle. Given a high-level task, the TaskNet planner decomposes it into a sequence of sub-tasks, each of which is further decomposed into task primitives with specifications. TaskNet comprises a first model for predicating the global sequence of working area to cover large terrain, and a second model for determining local operation order and specifications for each operation. The neural models may include convolutional layers for extracting features from grid map-based environment representation, and fully connected layers to combine extracted features with past sequences and predict the next sub-task or task primitive. Embodiments of the TaskNet are trained using an excavation trace generator and evaluate its performance using a 3D physically-based terrain and excavator simulator. Experiment results show TaskNet may effectively learn common task decomposition strategies and generate suitable sequences of sub-tasks and task primitives.

20 Claims, 16 Drawing Sheets

(51) Int. Cl.
  *G05B 13/02* (2006.01)
  *E02F 9/20* (2006.01)
(52) U.S. Cl.
  CPC ...... *B60W 2050/0028* (2013.01); *E02F 9/205* (2013.01); *G05D 2201/0202* (2013.01)
(58) Field of Classification Search
  CPC ......... G05D 2201/0202; G05D 1/0088; G06N 3/08; G06N 3/04; G06N 3/0454; G06N 3/088; G06N 3/084; G06K 9/00791; G06K 9/627; G06K 9/628; G06K 9/4628; G06K 9/6273; G06K 9/6268
  USPC ....... 701/27, 59, 481, 524; 382/156; 34/304, 34/309, 312, 414; 706/2, 4, 12, 15, 16, 706/52, 904, 912, 923
  See application file for complete search history.

(56) References Cited

U.S. PATENT DOCUMENTS

| | | | |
|---|---|---|---|
| 2018/0247160 A1* | 8/2018 | Rohani | ............... G05D 1/0088 |
| 2018/0293498 A1 | 10/2018 | Campos et al. | |
| 2019/0129436 A1 | 5/2019 | Sun et al. | |
| 2020/0409377 A1* | 12/2020 | Ready-Campbell | ... G01C 21/20 |
| 2021/0124359 A1* | 4/2021 | Wei | ...................... G05D 1/0217 |
| 2021/0132620 A1* | 5/2021 | Chen | ........................ G06N 3/08 |

OTHER PUBLICATIONS

Shi et al., "Experimental Robotic Excavation with Fuzzy Logic and Neural Networks," In Proceedings of the 1996 IEEE International Conference on Robotics & Automation, 1996. (6pgs).
Xu et al., "Neural Task Programming: Learning to Generalize Across Hierarchical Tasks", arXiv preprint arXiv: 1710.01813, 2018. (8pgs).
Kim et al., "Developing a Simple Model for Sand-Tool Interaction and Autonomously Shaping Sand," arXiv preprint arXiv:1908.02745, 2019. (9pgs).
Rezazadeh Azar et al., "Earthmoving equipment automation: A review of technical advances and future outlook," Journal of Information Technology in Construction (ITcon), vol. 22, No. 13, pp. 247-265, 2017. (19 pgs).
Carra et al.,"Robotics in the construction industry: state of the art and future opportunities," in ISARC, Proceedings of the International Symposium on Automation and Robotics in Construction, vol. 35, pp. 1-8, IAARC Publications, 2018. (8pgs).
Cai et al.,"Application of automation and robotics technology in high-rise building construction: an overview," in ISARC, Proceedings of the International Symposium on Automation and Robotics in Construction, vol. 35, pp. 1-8, IAARC Publications, 2018. (9 pgs).
Ha et al.,"Earthmoving construction automation with military applications: Past, present and future," in ISARC, Proceedings of the International Symposium on Automation and Robotics in Construction, vol. 35, pp. 1-11, IAARC Publications, 2018. (11 pgs).
Bansal et al.,"Chauffeurnet: Learning to drive by imitating the best and synthesizing the worst," Robotics: Science and System, vol. abs/1812.03079, 2019. ( 10pgs).
Dantam et al.,"Incremental task and motion planning: A constraint-based approach," in Robotics: Science and Systems, 2016. (11pgs).
M. Toussaint,"Logic-geometric programming: An optimization-based approach to combined task and motion planning," in Twenty-Fourth International Joint Conference on Artificial Intelligence, 2015. (7pgs).
Plaku et al.,"Motion planning with temporal-logic specifications: Progress and challenges," AI communications, vol. 29, No. 1, 2016. (12pgs).
Shiarlis et al.,"Taco:Learning task decomposition via temporal alignment for control," arXiv preprint arXiv:1803.01840, 2018. (12pgs).
Reed et al.,"Neural programmer-interpreters," arXiv preprint arXiv:1511.06279, 2015. (13 pgs).
Xu et al.,"Neural task programming: Learning to generalize across hierarchical tasks," in 2018 IEEE International Conference on Robotics and Automation (ICRA), pp. 1-8, IEEE, 2018. (8 pgs).
Kim et al.,"Adversarial Actor-Critic Method for Task and Motion Planning ProblemsUsing Planning Experience," in The Thirty-Third AAAI Conference on Artificial Intelligence (AAAI-19), 2019. (8pgs).
Rowe et al.,"Parameterized scripts for motion planning," in Proceedings of the 1997 IEEE/RSJ International Conference on Intelligent Robot and Systems. Innovative Robotics for Real-WorldApplications. IROS'97, vol. 2, pp. 1119-1124, IEEE, 1997. (6pgs).
Elezaby et al.,"Operator model for construction equipment," [Abstract Only] in 2008 IEEE/ASME International Conference on Mechtronic and Embedded Systems and Applications, pp. 582-585, IEEE, 2008. (2pgs).
Groll et al.,"Autonomous trenching with hierarchically organized primitives," [Abstract Only] Automation in Construction,vol. 98, 2019. (2pgs).
Seo et al.,"Task planner design for an automated excavation system," [Abstract Only] Automation in Construction, vol. 20, 2011. (2pgs).
Lagriffoul et al.,"Efficiently combining task and motion planning using geometric constraints," The International Journal of Robotics Research, vol. 33, No. 14, pp. 1726-1747, 2014. (22pgs).
Konidaris et al.,"Constructing symbolic representations for high-level planning," in Twenty-Eighth AAAI Conference on Artificial Intelligence, 2014. (9 pgs).
Garrett et al.,"Sampling-based methods for factored task and motion planning," The International Journal of Robotics Research, vol. 37, No. 13-14, pp. 1796-1825, 2018. (30pgs).
Office Action, dated Apr. 26, 2022, in Japanese Patent Application No. 2020-174568, and the machine translation. (9pgs).

\* cited by examiner

1200

NEURAL TASK PLANNER FOR AUTONOMOUS VEHICLES

BACKGROUND

A. Technical Field

The present disclosure relates generally to task planner for autonomous vehicles, especially neural network-based task planner for autonomous vehicles.

B. Background

Construction vehicles, e.g. excavators, are widely operated in industrial fields, such as miming, construction, agriculture for earth-moving tasks like trench-digging and material-loading. There emerges a trend of developing autonomous excavations solutions. The benefits that such kind of system can bring include lowering the labor cost and improving operation safety. Meanwhile, thanks to the recent extensive studies of autonomous driving vehicle, remarkable advances have been made in algorithms of perception, localization and navigation, as well as hardware sensors such as light detection and ranging (LIDAR) and cameras, which enables higher possibility of building a fully autonomously-operated construction vehicle.

As for building the planning and control system for autonomous vehicle, such as an excavator, one major challenge is to produce feasible and efficient construction task plan (e.g. excavation) and motion trajectory for the excavator to execute. Such construction task plan needs to be efficient with less base movement, compatible to the vehicle controller constraints, and yielding high success rate of execution. In general, the combined search space for computing feasible discrete decision and continuous collision-free motion are high-dimensional, and integrating the task and motion planners are challenging due to the high dimensional search space and different requirements for task and motion planning.

Accordingly, what is needed are systems, methodologies for implementing task planning for autonomous vehicles for improved performance.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
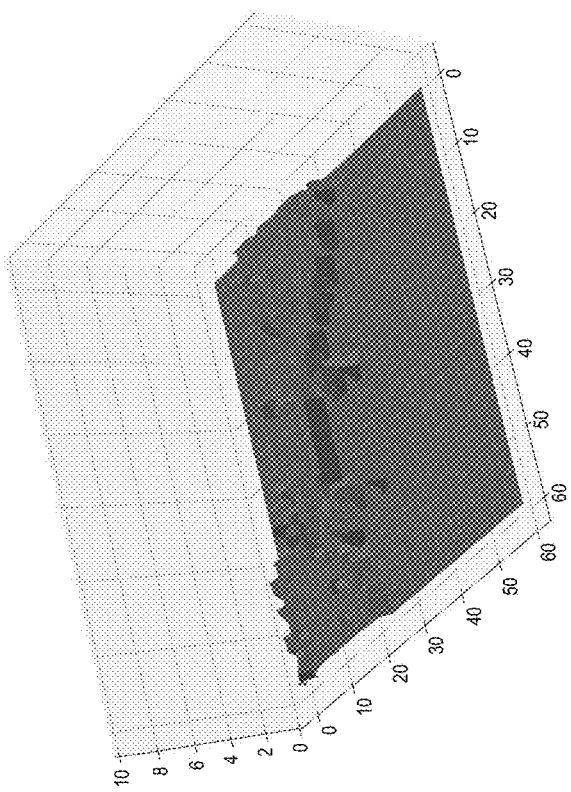
FIG. 1 depicts an example of grid height map converted from 3D LIDAR points captured in the real world according to embodiments of the present document.
Figure 1:
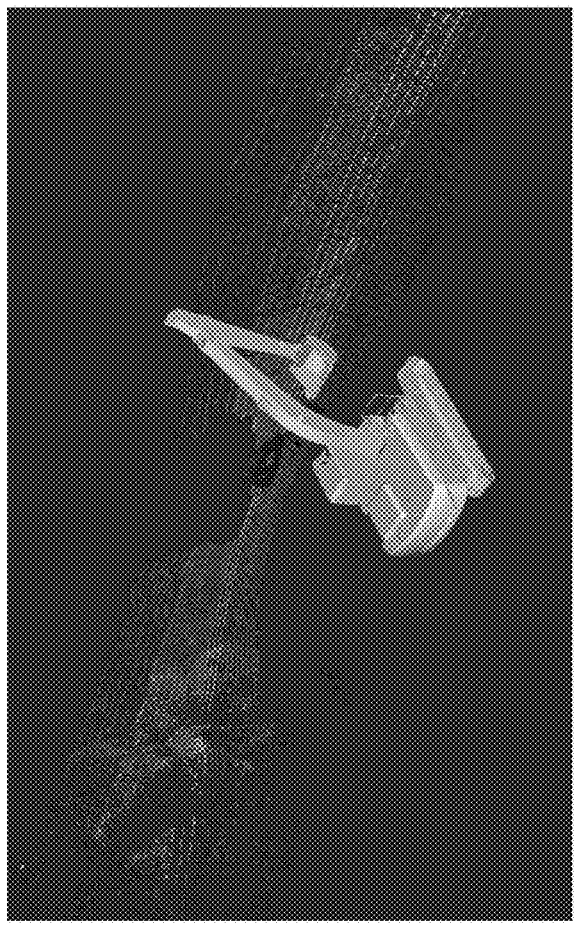

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. In one or more embodiments, a stop condition may include: (1) a set number of iterations have been performed; (2) an amount of processing time has been reached; (3) convergence (e.g., the difference between reward metrics of consecutive iterations is less than a first threshold value); (4) divergence the performance of the reward metric deteriorates); and (5) an acceptable reward metric has been reached.

The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state.

Any headings used herein are for organizational purposes only and shall not be used to limit the scope of the description or the claims. Each reference mentioned in this patent document is incorporated by reference herein in its entirety Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Construction vehicles, e.g. excavators, are widely operated in industrial fields, such as miming, construction, agriculture for earth-moving tasks like trench-digging and material-loading. There emerges a trend of developing autonomous excavations solutions. The benefits that such kind of system can bring include lowering the labor cost and improving operation safety. Meanwhile, thanks to the recent extensive studies of autonomous driving vehicle, remarkable advances have been made in algorithms of perception, localization and navigation, as well as hardware sensors such as light detection and ranging (LIDAR) and cameras, which enables higher possibility of building a fully autonomously-operated construction vehicle.

As for building the planning and control system for an autonomous construction vehicle, such as an excavator, one major challenge is to produce feasible and efficient construction task plan (e.g. excavation) and motion trajectory for the excavator to execute. Such construction task plan needs to be efficient with less base movement, compatible to the vehicle controller constraints, and yielding high success rate of execution. In general, the combined search space for computing feasible discrete decision and continuous collision-free motion are high-dimensional, and integrating the task and motion planners are challenging due to the high dimensional search space and different requirements for task and motion planning. One specific difficulty for certain construction tasks and motion planning is caused by the nature of the construction task. For example, for excavation tasks, a hydraulic driven robotic arm is interacting with soil, which is a deformable material. The accurate modeling of hydraulic systems and deformable materials must be conducted in high-dimensional space, leaving it difficult for traditional planning problem formulation or resulting in large computational complexity. Another difficulty is caused by the working environment of excavator, which is commonly an unstructured site and keeps varying along the process of excavation job. In practice, experience plays an important role in human excavator operations for selecting the order of motion sequences. Such human behavior patterns tends to be non-trial to model and consider.

Learning based task planning approaches have drawn increasing attention and have been actively studied in robotics field. Some imitation-learning based methods focus on developing neural network models to learn the underlying sequence decision strategy from human demonstration. Others exploit reinforcement-learning based methods to further explore the solution space in order to achieve improved efficiency. These learning-based methods are capable of being generalized to multiple tasks with changing environments, as well as inheriting the hidden human behavior pattern. These properties make learning-based approaches viable and practical options for autonomous excavation task planning. Yet, such application has not been fully investigated, especially for complex excavation tasks.

In one or more embodiments of the present disclosure, the learning based approach is exploited to address the construction task planning problem. For example, in excavation tasks, the sequence of operations may be divided into moving base and arm manipulation, while arm manipulation may be further decomposed into selecting the next digging point and digging certain location with selected depth. Such hierarchical nature of excavation task are utilized and embodiments of a TaskNet architecture with multiple layers of models are disclosed to translate a high-level task into sub-tasks then task primitives.

Contributions of the present patent disclosure comprise a novel neural network-based task planning formulation, which leverages the structure of task representation, e.g. excavation task, with hierarchies of individual models. One embodiment of the present invention is to sequentially translate observations to latent space representation, and convey detailed specifications to sub-level models.

Additionally, convolution layers are exploited in the model to handle the task and observation representation, as well as history data, which leverage both history information and speed of the training process. In one or more embodiments, individual layer of model may be trained separately to ensure robust performance. It was demonstrated that embodiments of the present model may be implemented in real-time system for closed-loop execution by observing the environment feedback. Furthermore, embodiments of the present method are able to learn from human expert data and to inherit the hidden behavior pattern.

It shall be understood that although one or more embodiments of the present invention use excavation as examples, the processes and model structures in those embodiments may also be applicable to other construction, agriculture, or industrial applications or vehicles, such as front loader, backhoe, etc.

B. Some Related Works

1. Task Planning of Autonomous Excavator

Given an excavation task, autonomous excavator needs to plan the overall excavation strategy for generating a sequence of excavation operations. Existing task planning methods largely exploit finite-state-machine (FSM) with rule-based transitions between states. Some introduced a method. called mass excavation parameterized scripts, of describing the desired task in a sequence of steps. Each step was represented as a state of FSM with event-based transitions. Similarly, some built another wheel loader planning system. A virtual operator model for operation of a wheel loader in simulation generates control inputs based on the environmental condition, where event-based finite state machine was involved.

Other than FSM, behavior-based approach was introduced to design excavation task planner, where excavation task was split into different phases and primitives, where rule-based transitions were employed to divide the task into phase then into primitives. Some proposed a high-level rule-based excavation task planner which involved work area segmentation, decomposing the terrain into layers, and scheduling and planning for the mobile base. The method was demonstrated with successful implementation in real-world system for a pile loading task.

2. Robotic Task and Motion Planning

Task and motion planning (TAMP) problems have been investigated considerably in robotics. Most of prior methods involves different levels of reasoning for decomposition of tasks. One category of TAMP considers the geometry constraints during task planning phase. Some formulates kinematically constrained problems to address geometric reasoning and task planning, wherein an optimization based approach is introduced to achieve a goal geometric state. Another topic in TAMP focuses on high level logic reasoning using symbolic representation for tasks. Some described a symbolic representation method for planning, which proves that symbols is able to represent the condition and effect that a planning agent can bring. Some further developed sampling-based method for TAMP, using symbolic representation to encode logic. Some formulated a temporal-logic specification based motion planning problem, which also tries to unveil the logic behind the ordering of task sequences.

While progress has been made, the main challenge of developing integrative TAMP approaches still lie in combining the discrete decision and high dimensional continuous motion search while ensure all constraints are satisfied. In the context of autonomous excavator tasks, environment is deformable and changing, which results in the difficulty for computing feasible task plans.

3. Learning-Based Neural Programming

State-of-art results in deep learning, especially in neural programming suggest a new perspective to solve the task planning problem. These approaches develop neural network models to learn the underlying sequence decision strategy from training data. One breakthrough in field of neural programming was introduced in neural programming interpreter (NPI). NPI is a neural network model trained via imitation learning to mimic the function of computer program. The learnt model may trigger programs recursively, terminate the program or return to upper-level program in a recursive manner. Such hierarchical layouts shares similarity with excavation task planner, if the programs are compared as tasks. Some studies inherited the idea of NPI and extended it to neural task programming (NTP), which is more specific for task planning problem. NTP explicitly introduce the decomposition of tasks specifications into finer sub-task specifications and further to subroutines, which are comparable to primitives in task planning problem. NTP shows strong generalization ability for sequential tasks with hierarchical structures.

Excavation specific task planning method suffers generalization issue, where the designed planner can hardly be re-used for different scenarios and tasks. On the contrary, learning-based task planning approaches have the potential of adaptivity and generalization to environmental conditions and task targets respectively. One or more embodiments of the present patent disclosure aim to bridge the gap between excavation task planning and learning-based neural programming method.

C. Embodiments of TaskNet Planner

1. Problem Definition

In one or more embodiments, the problem of task planning is considered for autonomous excavator. Some embodiments are focused on the excavation tasks such as trenching, digging and material-relocating, which involve altering the shape of the terrain. In one or more embodiments, $\mathbb{T}$ is the set of task descriptions and $\mathbb{O}$ represents the set of all environment observation. A function g: $\mathbb{T} \times \mathbb{O} \to \{0, 1\}$ is used to justify whether the task is completed (g=1) or not (g=0). The task planner to be designed is able to split such main task into sequences of sub-tasks and then task primitives with specifications respectively. $\mathbb{S}$ is used for the set of sub-tasks and $\mathbb{A}$ represents the set of sub-task specifications. $\mathbb{P}$ is used for the set of task primitives and $\mathbb{B}$ represents the set of task primitive specifications. The specification fields help the low-level motion planner and controller execute with high success rate. Furthermore, some data-driven methods are exploited to solve such task planning problem to mimic the behavior of human. In one or more embodiments, the formal problem statement may be described is the following:

Problem 1: Given the environment observation feedback $o(t) \in \mathbb{O}$ at time t and a task description $t_a \in \mathbb{T}$, design a task planner that can generate a sequence of sub-tasks and specifications $$[(s_1,a_1),(s_2,a_2),(s_3,a_3), \ldots ,(s_m,a_m)],$$

where $s_i \in \mathbb{S}$ and $a_i \in \mathbb{A}$; furthermore the planner may convert such sequence into task primitives with detailed specifications $$\Phi=[(p_1,b_1),(p_2,b_2),(p_3,b_3), \ldots ,(p_n,b_n)],$$

where $p_i \in \mathbb{P}$ and $b_i \in \mathbb{B}$. So that, after executing the task primitives $g(t_a, o(t))=1$.

2. Grid Map for Environment and Task Representation

In one or more embodiments, the environment may be represented as a 2D grid map. G (p, q) denotes the height value of a cell in the p-th row and q-th column of the grid map of the terrain. FIG. 1 shows an example of grid height map, which is converted from 3D LIDAR points captured in the real world. As compared to raw 3D points, 3D meshes or other representation, the grid map representation may be conveniently used as tensor inputs for convolutional layers of neural models. In one or more embodiments, by using grid map representation, environment features may also be efficiently learned by the convolutional neural layers.

Typical excavation tasks may alter the shape of the terrain, which may be defined by specifying the target height $G_{target}$ for each cell in the grid map. In one or more embodiments, a general high-level task may be specified as:

$$|G(p,q)-G_{target}(p,q)|<\in, \forall p \text{ and } q \qquad (1)$$

where $\in$ is an excavation accuracy tolerance parameter.

By specifying the function $G_{target}$, different excavation tasks may be defined. For instance, $G_{target}$ with constant 0 may define a task to level a region, and $G_{target}$ with a constant negative value may define a task to dig a trench with a target depth.

Figure 2:
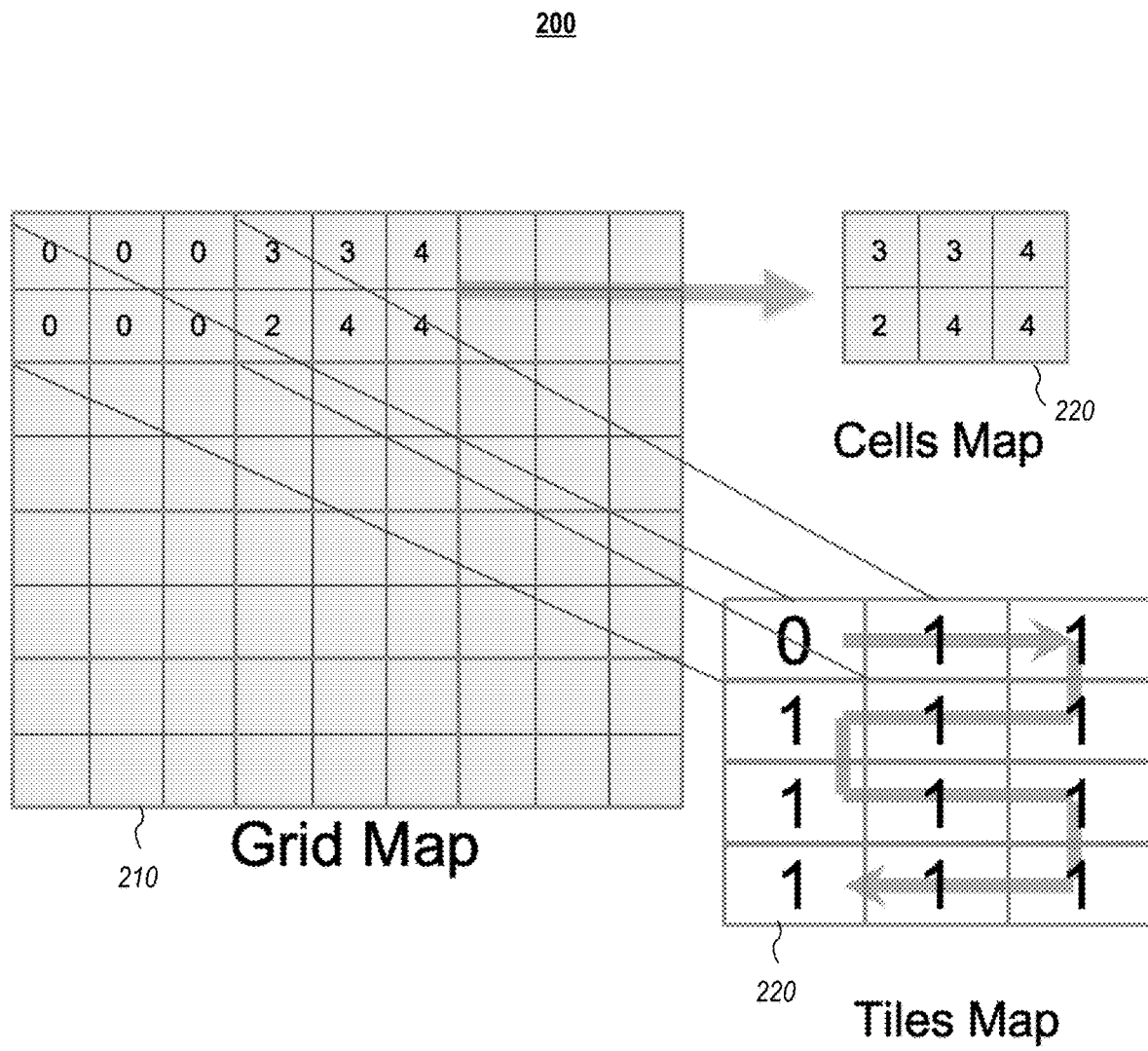
FIG. 2 depicts illustration of grid map, tiles map, cells map and a zig-zag order for processing tiles, according to embodiments of the present document.

As shown FIG. 2, given a grid map 210 for the environment, tiles map $G_{tile}$ 220 may be further defined. In the tiles map, each tile is a rectangular shape and may comprise multiple cells. A cells map $G_{cell}$ 230 may also be further defined as a chopped sub-map of whole grid map. $G_{tile}(p, q)$ is set as 0 if every cell within this tile has been processed; otherwise, $G_{tile}(p, q)$ is 1. Given an excavation task, the excavator processes tile by tile until all tiles have been processed.

3. Methodology Overview

In one or more embodiments, neural programming is adopted for methodology embodiments, wherein a general task is taken as input and either sub-tasks or task primitives are recursively triggered. In excavation task embodiments, the sequence of operations may be divided into two categories. One is to move the vehicle base to a location, the other one is to conduct excavation while the base remains static. Furthermore, while conducting excavation with static base, the excavator arm movements may be decomposed as selecting the next digging point and digging certain location with selected depth. According to such observations, hierarchical definitions of sub-tasks and task primitives are defined and shown in Table 1.

TABLE 1

Sub-Tasks and Primitives List

| ($\mathbb{S} \times \mathbb{A}$) | ($\mathbb{P} \times \mathbb{B}$) |
|---|---|
| (move_to_tile, global coordinate) | (move_base, trajectory) |
| (excavate_tile, tile terrain) | (approach, local coordinate) |
|  | (dig, depth) |

In one or more embodiments, a neural-network based task planner (or a task planning network, TPN) is disclosed, which may comprises two layers of model to translate a task into motion primitives. The first model is a sub-task determining model (SDM), which may be also called Tile Excavation Model (TEM), i.e. $\Psi_{TEM}(\cdot)$, in one or more embodiment described hereinafter, to determine one or more desired sub-tasks. The second model is a primitive determining model (PDM), which may be also referred as Cell Excavation Model (CEM), i.e., $\Psi_{CEM}(\cdot)$, in one or more embodiment described hereinafter, to determine one or more desired task primitives based at least on a sub-task input.

In one or more embodiments, given the environment observation feedback o(t), the TEM model selects the sub-task $s(t) \in \mathbb{S}$ to trigger along with certain specifications $a(t) \in \mathbb{A}$ and determines whether to terminate the planner $t_e \in \{0, 1\}$. In one or more embodiments, this process may be described by (2).

$$(s(t), a(t), t_e) = \Psi_{TEM}(t_a, o(t)) \qquad (2)$$

Similarly, based on the local environment observation õ(t), sub-task s(t) and specification a(t), CEM generates the desired task primitive $p(t) \in \mathbb{P}$, motion specification $b(t) \in \mathbb{B}$ and whether sub-task is finished, as expressed in (3).

$$(p(i), b(i), \tilde{t}_e) = \Psi_{CEM}(a(i), \tilde{o}(i)) \qquad (3)$$

In one or more embodiments, the PDM model may be a path planning module to deal with path planning problem when the sub-task determined by the TEM model is a move_to_tile sub-task assignment. The path planning module may be defined as:

$$(p(i), b(i), \tilde{t}_e) = \Psi_{PATH}(a(i), \tilde{o}(i)) \qquad (4)$$

Wherein $\tilde{t}_e$ is an indicator to indicate that the sub-task is completed when $\tilde{t}_e=1$ or not completed $\tilde{t}_e=0$. It shall be noted that the index for TEM is t and the index for CEM/PATH is i in order to differentiate the time scale between the two models. In one or more embodiments, an overall task planning methodology may be shown in Methodology 1.

---
Methodology 1. TaskNet - Excavator Task Planner
Input: Task description $t_a \in \mathbb{T}$ and environment observation o(t) $\in \mathbb{O}$
Output: Task Primitive sequence $\Phi$

```
1    t_e = 0
2    Φ = { }
3    while t_e == 0 do
4        (s(t), a(t), t_e) = Ψ_TEM (t_a, o(t))
5        t̃_e = 0
6        while t̃_e == 0 do
7            if s(t) == move_to _tile then
8                (p(i), b(i), t̃_e) = Ψ_PATH (a(i), õ(i))
9            else
10               (p(i), b(i), t̃_e) = ΨCEM (a(i), õ(i))
11           Execution of Primitive p(i)
12       end
13       Φ.append (p(i), b(i), t̃_e)
14   end
15   end
```
---

4. From Discrete Plan to Continuous Motion

Figure 3:
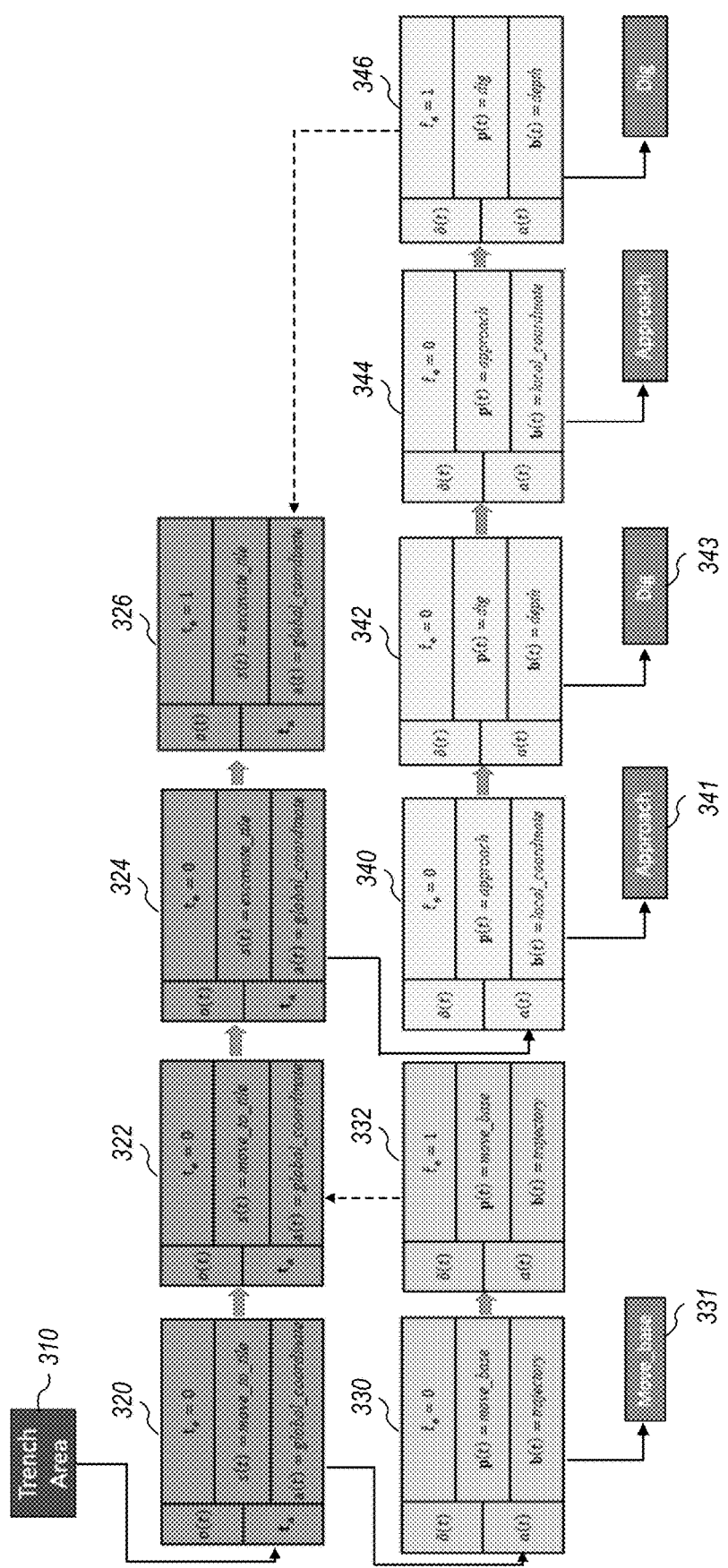
FIG. 3 graphically depicts a sequence from a task to primitives, according to embodiments of the present document.

In one or more embodiments, the presented hierarchical task planner decomposes a high-level task and produces a sequence of task primitives with specifications correspondingly. For instance, a trench area task may be split into a sequences of task primitives, as graphically shown in FIG. 3. In one or more embodiments, the generated sequence of primitives is a naturally straightforward motion planning problem for existing planning algorithms. These task primitives with detailed specifications are fed to a motion planner for trajectory generation. The trajectories of either joints movement or excavator base movement are then executed by excavator controller(s).

Figure 4:
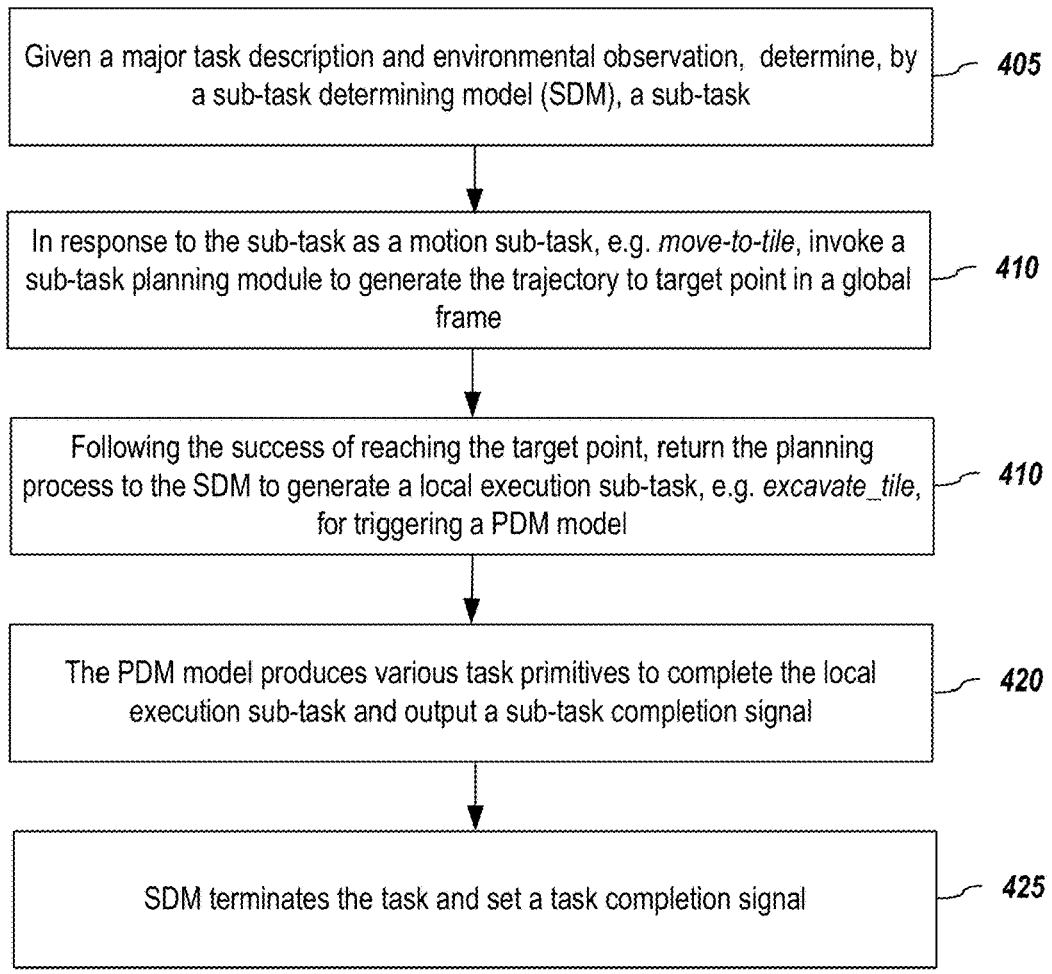
FIG. 4 depicts a process to perform task planning, according to embodiments of the present document.

FIG. 4 depicts a process to perform task planning, according to embodiments of the present document. Given a major task description (e.g. $t_a$=trench_area) and environmental observation o(t), a SDM model, $\Psi_{TEM}$ (320, 322, 324 or 326), first determine (405) a sub-task. In response to the subtask as move_to_tile, a sub-task planning module $\Psi_{PATH}$ (330 or 332) is invoked (410) to generate the trajectory to target point or tile in a global frame; Following the success of reaching the target point ($t_e$=1), the planning process returns (415) to $\Psi_{TEM}$. In response to the $\Psi_{TEM}$ to generate a local execution sub-task, e.g. a sub-task of excavate_tile for triggering a PDM model, $\Psi_{CEM}$ (340, 342, 344 or 346), for excavation motions; $\Psi_{CEM}$ model produces (420) various task primitives to complete the sub-task and output $\tilde{t}_e$=1 (a sub-task completion signal) when done; execution of each task primitive, such as move_base 331, approach 341 and dig 343, effects the environment, thus influencing or updating the observation o(t) and õ(t); $\Psi_{TEM}$ eventually terminates (425) the whole process and set $t_e$=1 (task completion signal), while monitoring the observation o(t).

D. Model Embodiments

In one or more embodiments, the design for a first model, e.g. a tile excavation model (TEM), and a second model, e.g. a cell excavating model (CEM) is presented. Both models may share a similar structure, which may comprise of four sub-models i.e., a planning core $f_{core}$, a sub-task or primitive decoder $f_x$, a specification decoder $f_{spec}$, and a termination decoder $f_{term}$. In one or more embodiments, given a general input representation u, the general workflow of the models may be described in equation (5)

$$x=f_{core}(u), y_1=f_x(x), y_2=f_{spec}(x), y_3=f_{term}(x) \quad (5)$$

Where $y_1 \in \{s(t), p(i)\}$ is either a sub-task or a primitive; $y_2 \in \{a(t), b(i)\}$ is the specification; and $y_3 \in \{t_e(t), \tilde{t}_e(i)\}$ represents the termination indicator. Details of each planning model are provided in the following description.

1. Tile Excavation Model Embodiments

Figure 5:
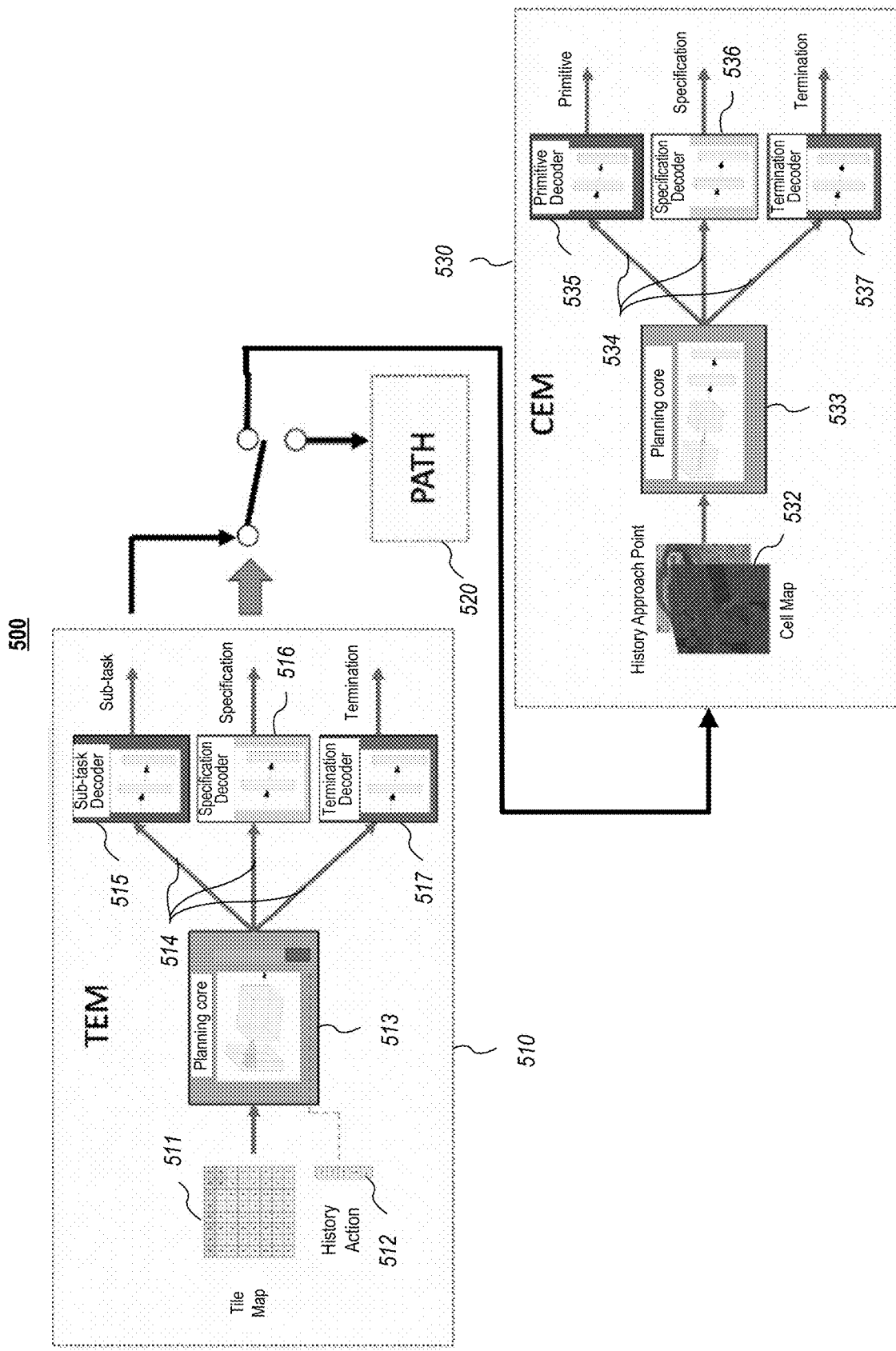
FIG. 5 depicts a system model structure, according to embodiments of the current disclosure.

FIG. 5 depicts a system model structure, according to embodiments of the current disclosure. In one or more embodiments, at a tile excavation planning level, given a tiles map as the input task, the global sequence of tiles needs to be determined in order to cover large terrain. TEM 510 may predicate the next tile that the excavator needs to operate based on the latest tiles map and the history of the processed tiles. In particular, TEM 510 may take the input of the tiles map $G_{tile}(t)$ 511 and the past sequences 512 of sub-tasks (s(t), s(t-1), ..., s(t-k)). Therefore, the input of the TEM may be presented as:

$$u(t)=(G_{tile}(t),(s(t),s(t-1), \ldots ,s(t-k))) \quad (6)$$

In one or more embodiments, the TEM 510 may comprise a first planning core 513 comprising multiple convolutional layers to process an environment representation 511, e.g. a tiles map, to extract features 514 (e.g. a latent space representation) from the environment representation. The extract features 514 are conveyed to other sub-models in the TEM for further processing. In one or more embodiments, the TEM 510 may further comprise a sub-task decoder 515 to output a sub-task move_to_tile or excavate_tile, a first specification decoder 516 to output specification for the sub-task, and a first termination decoder 517 to output a task termination status to indicate whether the input task is completed.

In response to the TEM outputting a motion sub-task (e.g. move_to_tile), the associated specification may be chosen from four possible directions {LEFT, RIGHT, DOWN, UP} to indicate the next tile to move. Given the moving direction, a global coordinate location may be computed to specify where the base of the excavator moves to. The information of the sub-task move_to_tile, the associated specification, and the global coordinate are then used by a path planning module 520 for excavator motion execution.

In one or more embodiments, TEM may output a sub-task excavate_tile. The specification for this tile is the grid map of the cells within this tile. The sub-task excavate_tile, the associated specification of the cells 532 are then used by the CEM 530 for tile excavation execution. In one or more embodiments, the CEM 530 may comprise a second planning core 533 comprising multiple convolutional layers to process the cell map 532, to extract features 534. In one or more embodiments, historical information, e.g. history approach point(s) may also be used by the second planning core 533 for feature extraction. In one or more embodiments, the CEM 530 may further comprise a primitive decoder 535 to output a desirable primitive, a second specification decoder 536 to output specification for the primitive, and a second termination decoder 537 to output a sub-task termination status to indicate whether the sub-task is completed.

In one or more embodiments, in order to mimic the tile processing order from the training data, the history record 512 of processed tiles may also be used. In one or more embodiments, the past sequence of tile movement direction is stacked as a vector with the features extracted from the tiles map. The concatenated vector is fed to multiple full-connected connected layers generate the appropriate sub-tasks. Unlike NPI model using LSTM-based architecture, stacking the history information is chosen as an input to fully connected layers in one or more embodiments of the present invention, mainly for efficient training and fast convergence.

2. Cell Excavation Model Embodiments

In one or more embodiments, the Cell excavation model is triggered by a tile excavation sub-task with its specification, as shown in FIG. 5. In one or more embodiments, the specification is a local terrain height map, which is part of the entire task terrain height map, chopped by the tile excavation model. Given the local terrain map, the cell excavation model generates one or more sequences of task primitives of approach and dig.

In one or more embodiments, given the sub-task excavation_tile with its specification a, the input of the model comprises the local terrain observation õ(i) according to the specification a and the last task primitive approach specification b(i-1), which is represented as two-dimensional one-hot vector. In one or more embodiments, the input of the cell excavation model may be represented as:

$$u(i)=(G_{cell}(i),b(i-1)) \in \mathbb{R}^{h \times w \times 2} \quad (7)$$

Where h and w are the height and width of the local terrain observation. Following (5), the core model first take such input u(i) and produce the local planning state s̃(i). Next, the primitive decoder takes the local planning state to produce the primitive selection p(i), either approach the end-effector to a certain point or excavate on the current location with certain depth; the specification decoder takes s̃(i) to produce the specifications b(i) for each primitive, i.e., local_coordinate of approach primitive or depth for the excavate primitive. In one or more embodiments, the outputs may be represented as one-hot vector. The termination decoder as well takes s̃(i) to predict $\tilde{t}_e(i)$ either the sub-task has been completed or not.

Figure 6:
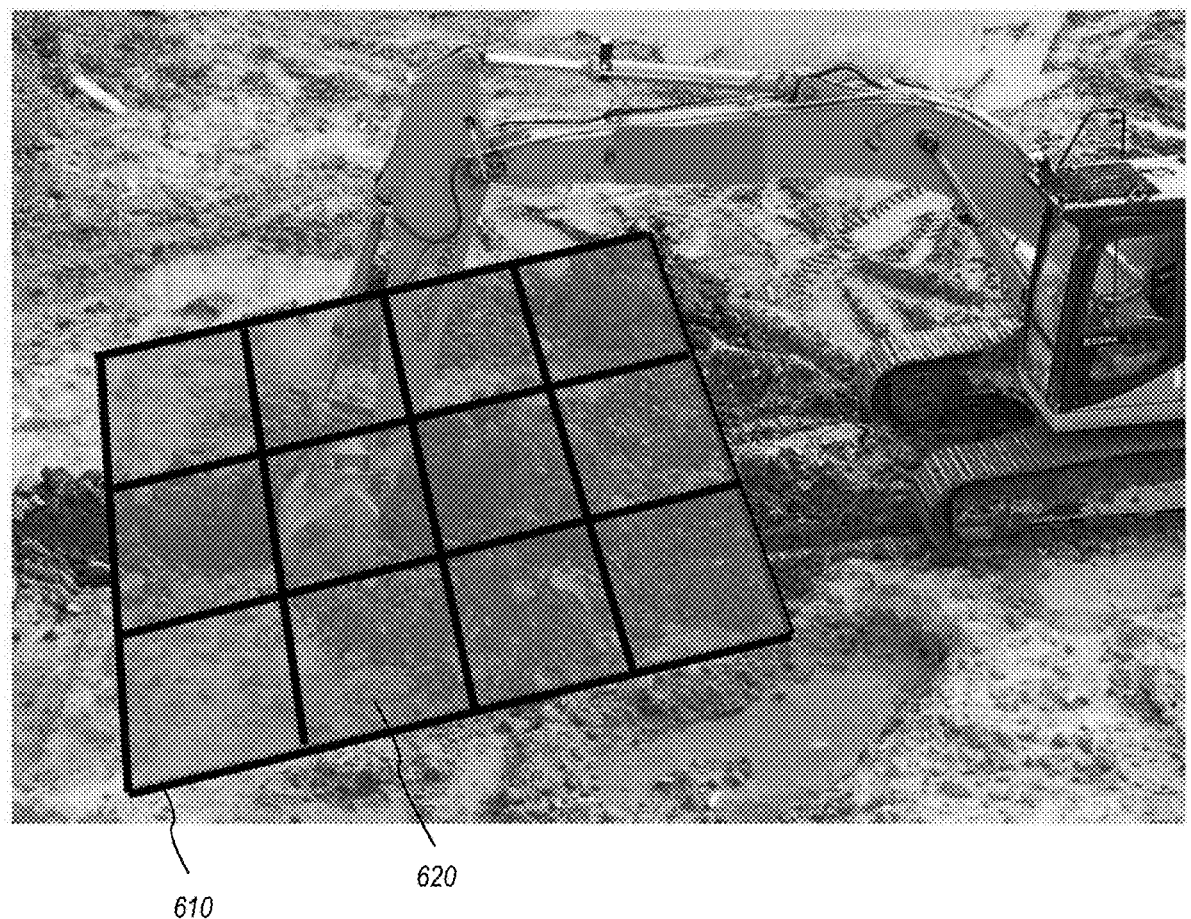
FIG. 6 depicts an example of local terrain excavation, according to embodiments of the present disclosure.

FIG. 6 shows an example of local terrain excavation with h=4 and w=3. The local terrain excavation is implemented on a tile 610 comprising 3×4=12 cells 620. The height and width of the tile may vary in other situations.

3. Model Training Embodiments

In one or more embodiments, both the SDM model (e.g. TEM) and the PDM model (e.g. CEM) are trained in a similar supervised fashion with sequences of execution traces. The SDM model may be trained with a sub-task training dataset and the PDM model may be trained using a primitive training dataset. General symbolic representations may be used for input and output of the models to describe the training process uniformly. In one or more embodiments, the recorded sequences are lists of input-output pair (u, (ŷ$_1$, ŷ$_2$, ŷ$_3$)), where u, y$_1$, y$_2$ and y$_3$ are defined by (5), (6), and (7), respectively to the TEM and CEM models.

In one or more embodiments, the training objective is to maximize the probability of generation of correct execution sequence pair, i.e., the optimal model parameters θ* is defined as $$\theta^* = \max_{\theta} \sum \log P((\hat{y}_1, \hat{y}_2, \hat{y}_3) \mid u(\cdot), \theta) \qquad (8)$$

In one or more embodiments, the loss functions may be defined as the weighted sum of the error between the predicated sub-task/primitive, specification, termination status and those in the recorded training data. The loss function may be expressed as follows:

$$\mathcal{L} = \Sigma \alpha \mathcal{L}_x(y_1, \hat{y}_1) + \beta \mathcal{L}_b(y_2, \hat{y}_2) + \gamma \mathcal{L}_t(y_3, \hat{y}_3) \qquad (9)$$

Where α, β and γ are parameters and $\mathcal{L}_x$, $\mathcal{L}_b$, $\mathcal{L}_t$ are all cross-entropy losses. For the SDM, the loss function may be referred as a first loss function with the loss term $\mathcal{L}_x$ representing error between the predicated sub-tasks and recorded sub-tasks. While for the PDM, the loss function may be referred as a second loss function with the loss term $\mathcal{L}_x$ representing error between the predicated primitives and recorded primitives.

E. Some Experiment Results

It shall be noted that these experiments and results are provided by way of illustration and were performed under specific conditions using a specific embodiment or embodiments; accordingly, neither these experiments nor their results shall be used to limit the scope of the disclosure of the current patent document.

In one or more experimental settings, to evaluate the performance of the proposed approach, TEM and CEM models were first trained and tested. Embodiments of the neural task planner TaskNet were further implemented and integrated with an inverse kinematic based arm motion planner. The entire system was further tested on a 3D physically-based simulator for various excavation scenarios.

1. Data Collection and Model Implementation

In one or more implementations, training data sequences for TEM and CEM models were generated via customized program called trace generator.

Figure 7B:
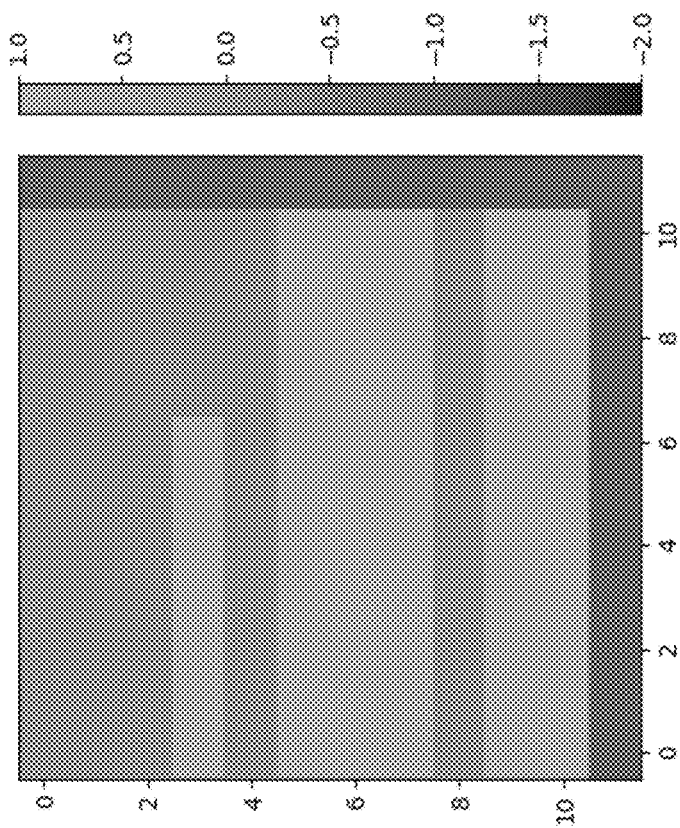
FIG. 7B depicts a second tiles map with skipping rows, according to embodiments of the present disclosure.
Figure 7A:
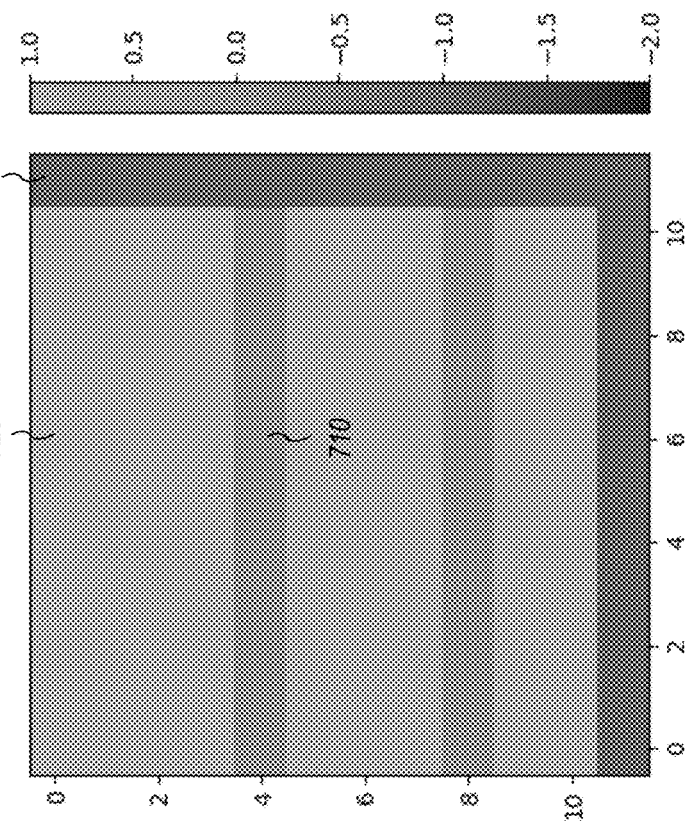
FIG. 7A depicts a first tiles map with skipping rows, according to embodiments of the present disclosure.
Figure 7D:
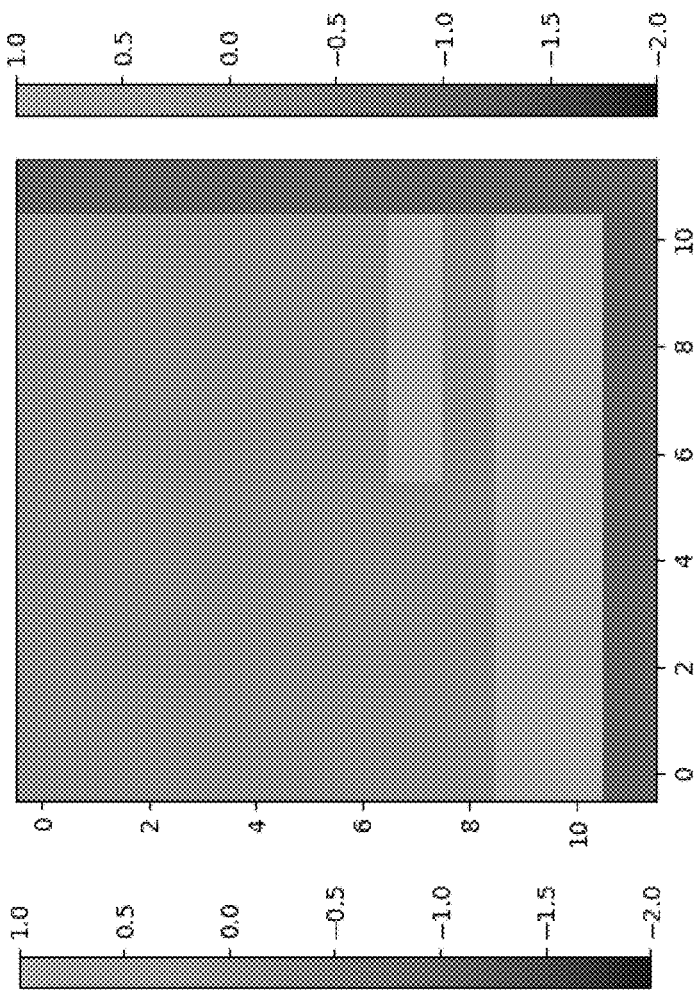
FIG. 7D depicts a fourth tiles map with skipping rows, according to embodiments of the present disclosure.
Figure 7C:
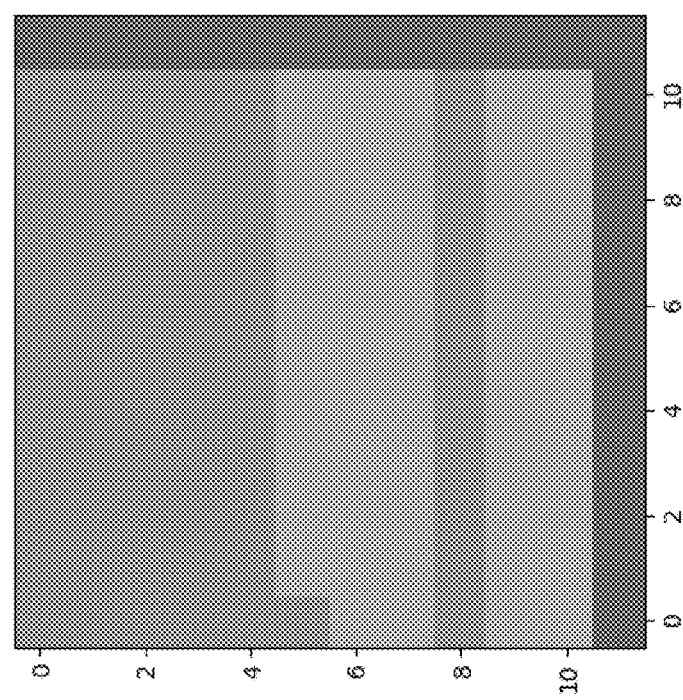
FIG. 7C depicts a third tiles map with skipping rows, according to embodiments of the present disclosure.
Figure 7E:
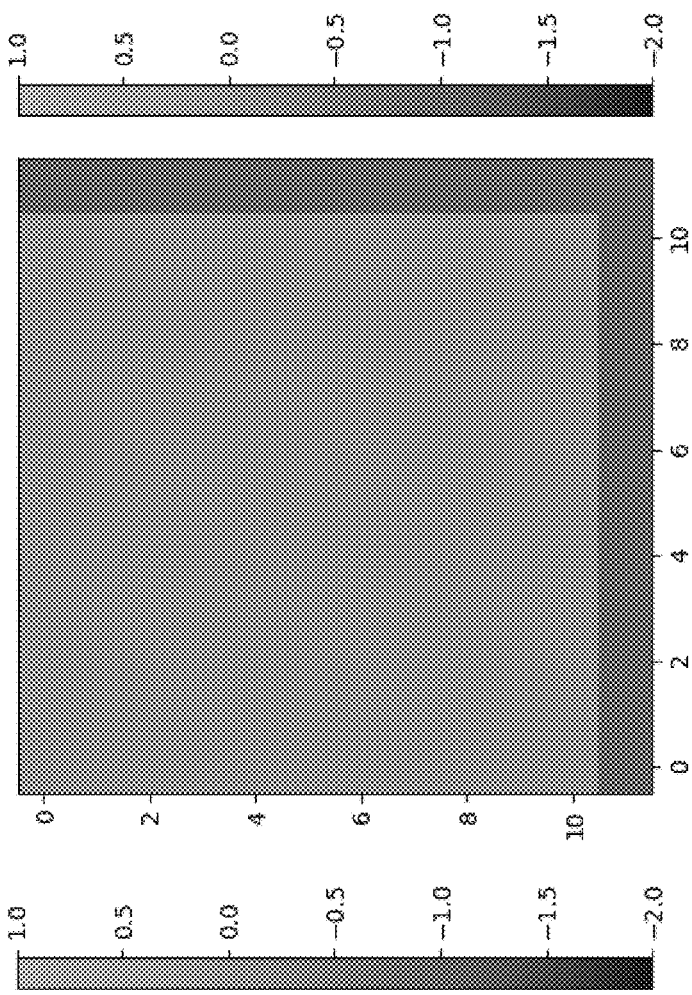
FIG. 7E depicts a fifth tiles map with skipping rows, according to embodiments of the present disclosure.
Figure 7F:
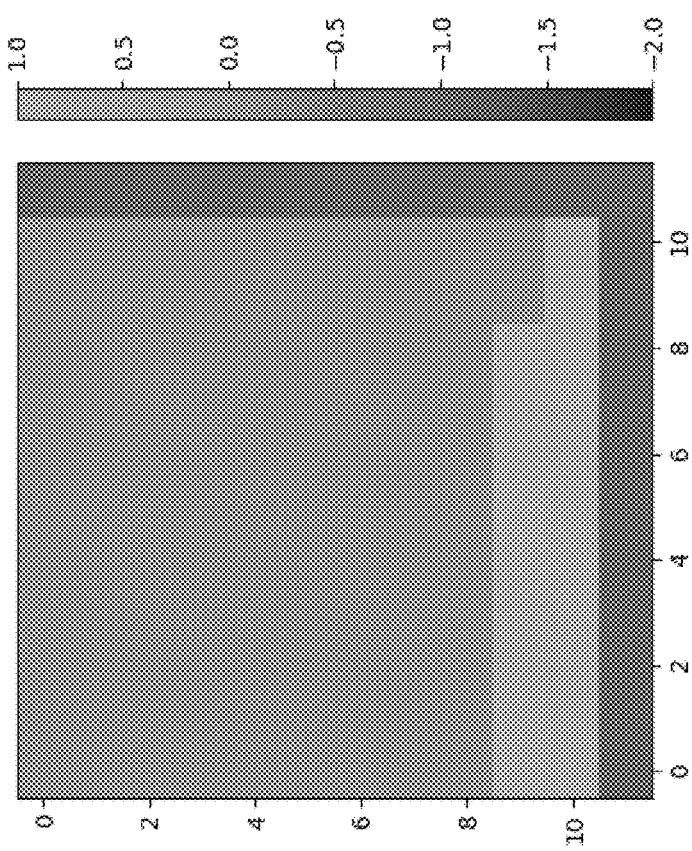
FIG. 7F depicts a sixth tiles map with skipping rows, according to embodiments of the present disclosure.

Tile Excavation Model trace generator includes a sketchpad for managing a tile map and a tile excavation simulation module. The sketchpad may initialize a tile map with randomized rows and columns. The sketchpad has application programming interfaces (APIs): move tile for changing its current tile pointer to its adjacent tile, and excavate tile for changing the excavation status of the current tile (e.g. from unprocessed to processed). In one or more settings, those typical excavation orders observed in the real world were simulated. One common traversal order used by excavator operators for large working area is zig-zag order, which is shown in FIG. 2. The training data consists of 1,000 different dimensional tiles maps with dimension up to 12×12, in total 71,066 samples, where each sample is defined as an observation feedback o(t) including the current tiles map and next sub-task. In one or more implementations, a batch size of 128 and learning rate 1e–4 were used for the training. FIG. 7A-7F depicts tiles map with skipping rows according to embodiments of the present disclosure. As shown in FIG. 7A-7F, the TEM may learn a model to skip those rows, which were explicitly marked as non-excavation status. In order to skip such a row, one or more model embodiments exploit the convolutional layers and learn that every tile in the row is non-excavation status. In FIG. 7A, the grey rows 710 are to skip, the tiles in dark grey 720 indicate the boundary of the tiles map, and only light grey tiles 730 need to be processed. FIGS. 7B-7F show that the trained TEM model is able to skip rows and only process the light grey rows that need to be excavated. Furthermore, embodiments of learned TEM model may cover the tiles in zig-zag order, as demonstrated in the training data.

Figures 8A, 8B:
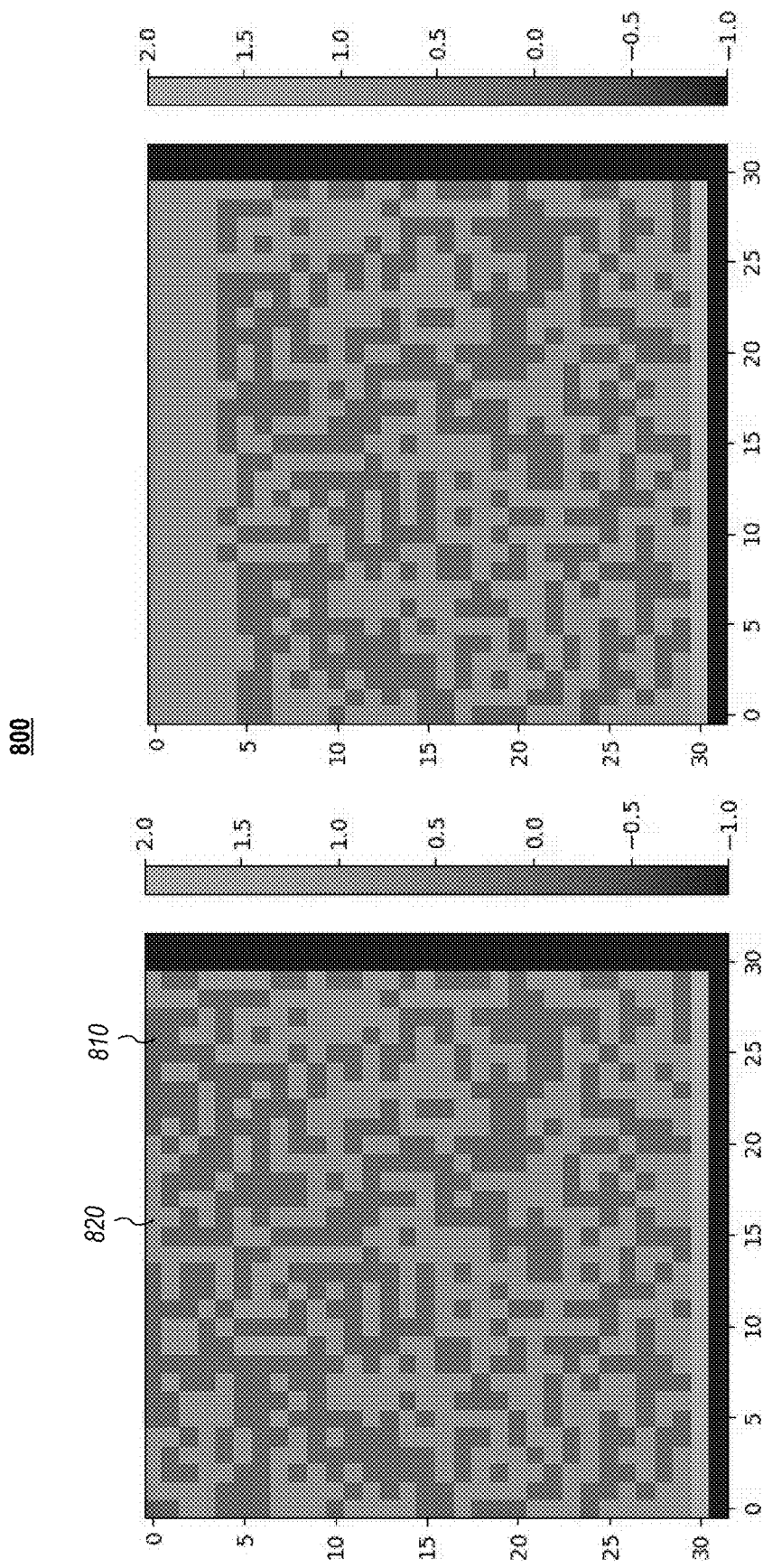
FIG. 8A depicts a first randomized tiles map, according to embodiments of the present document.
FIG. 8B depicts a second randomized tiles map, according to embodiments of the present document.
Figures 8C, 8D:
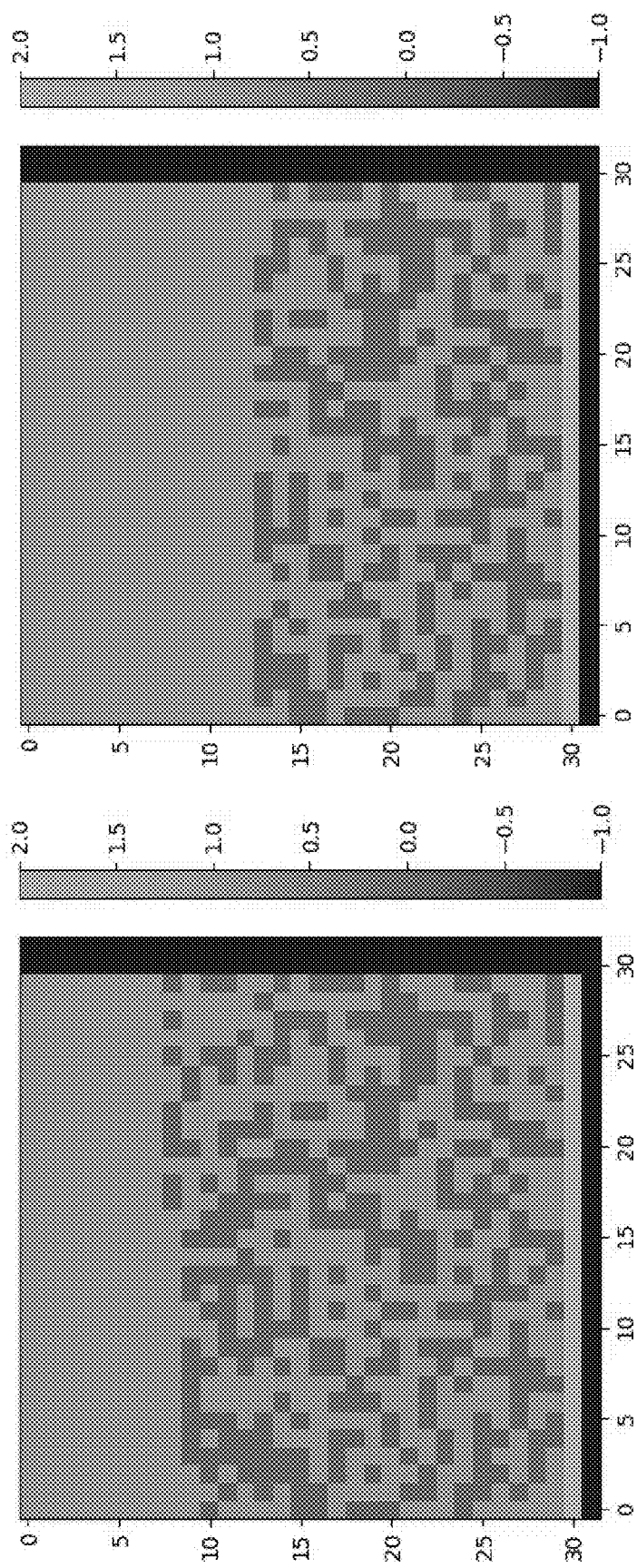
FIG. 8C depicts a third randomized tiles map, according to embodiments of the present document.
FIG. 8D depicts a fourth randomized tiles map, according to embodiments of the present document.
Figures 8E, 8F:
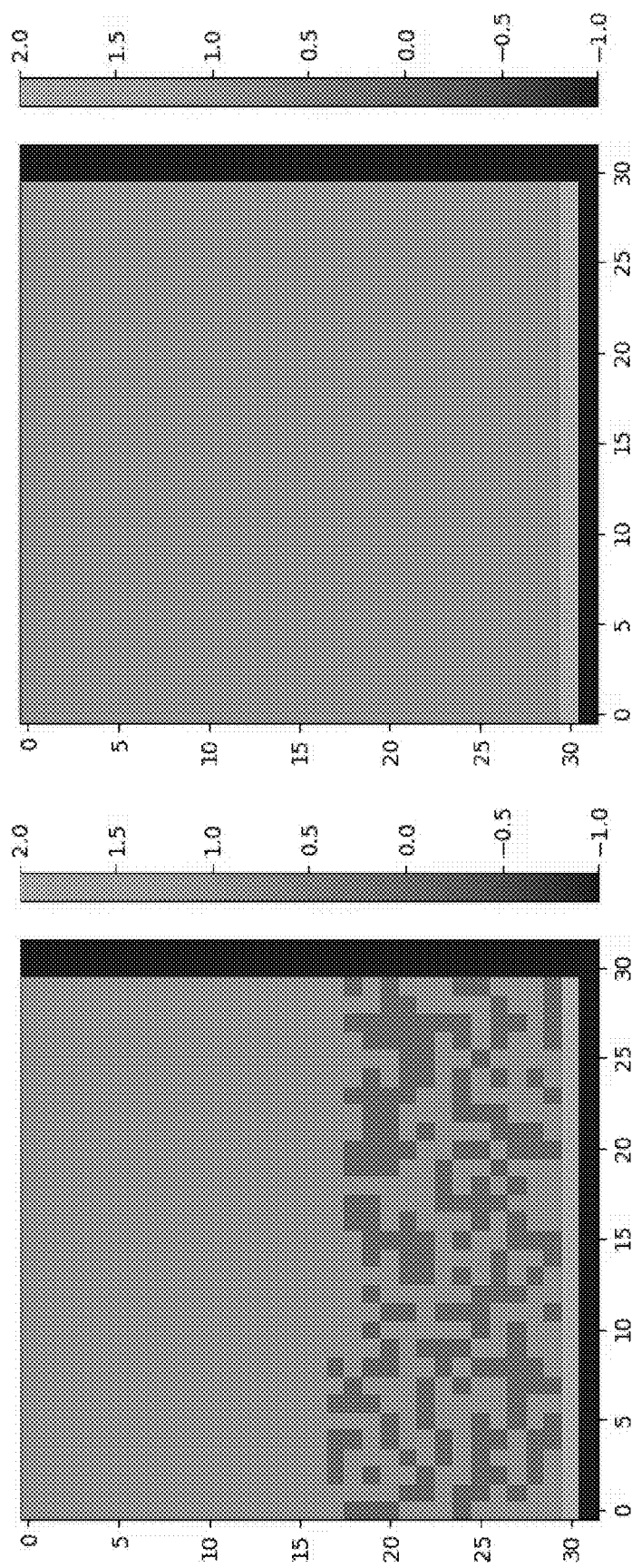
FIG. 8E depicts a fifth randomized tiles map, according to embodiments of the present document.
FIG. 8F depicts a sixth randomized tiles map, according to embodiments of the present document.

In one or more experimental settings, TEM generalization capability was further evaluated. A dataset comprising 3,000 different dimensional tile maps with dimension up to 32×32, in total 1,126,900 samples, was generated. Each grid map was randomly generated to comprise both excavation and non-excavation tiles. One or more TEM embodiments were trained on this dataset and tested on randomized generated tile maps, which do not exist in the training dataset. FIGS. 8A-8F depict randomized tiles map, according to embodiments of the present document. As shown in FIGS. 8A-8F, embodiments of the learned TEM model may skip non-excavation tiles and cover the rest tiles in zig-zag order. In FIG. 8A, an initial 30×30 tiles map is randomly generated. The TEM model only needs to process all dark grey tiles 810, while skipping all grey tiles 820. FIGS. 8B-8F show that TEM model is able to skip tiles and only process these that need to be excavated. Embodiments of the learned TEM model may cover the tiles in zig-zag order. The model is able to generalize for unseen randomized generated tiles map, which do not exist in the training dataset.

Cell Excavation Model may also be trained in similar manner with a trace generator to generate synthesized data. Another sketchpad is initialized with execution APIs: approach and dig. In one or more experimental settings, the training data for CEM model comprise 10,000 number of sequences, with maximum dimension of 6×6. Embodiments of the model were trained with a batch size of 1,000 with learning rate of 1e–3. In current implementation, the generator program follows a logic to approach to the highest cell and dig first, which may not be the case in reality. However, embodiments of the trained model are able to follow the same logic in the data and complete the excavation task.

2. Some Planner Implementation and Simulation Results

In one or more experimental settings, embodiments of the task planner TaskNet were implemented using the trained models tile excavation model and cell excavation model. The task planner took input a high level task such as trenching a rectangular shape with a desired depth. The task planner decomposed the tasks and generates a sequence of motion primitives with specification for the motion planner. The motion planner model computed the feasible arm and base motion based on the specification. For the arm motion, an inverse kinematic solver was used to compute the joint configuration. Embodiments of the task planner assigned primitives to a simulated excavator, which ran in a 3D simulated environment. In the experiment, a model of an excavator with 3.5 ton was used. The excavator model has the boom length 2.00 m, stick length 1.05 m, bucket length 0.60 m and base height 0.35 m. The simulator is capable of simulating the dynamics of the excavator and its interaction with the terrain using particle based terrain simulation.

Figure 9:
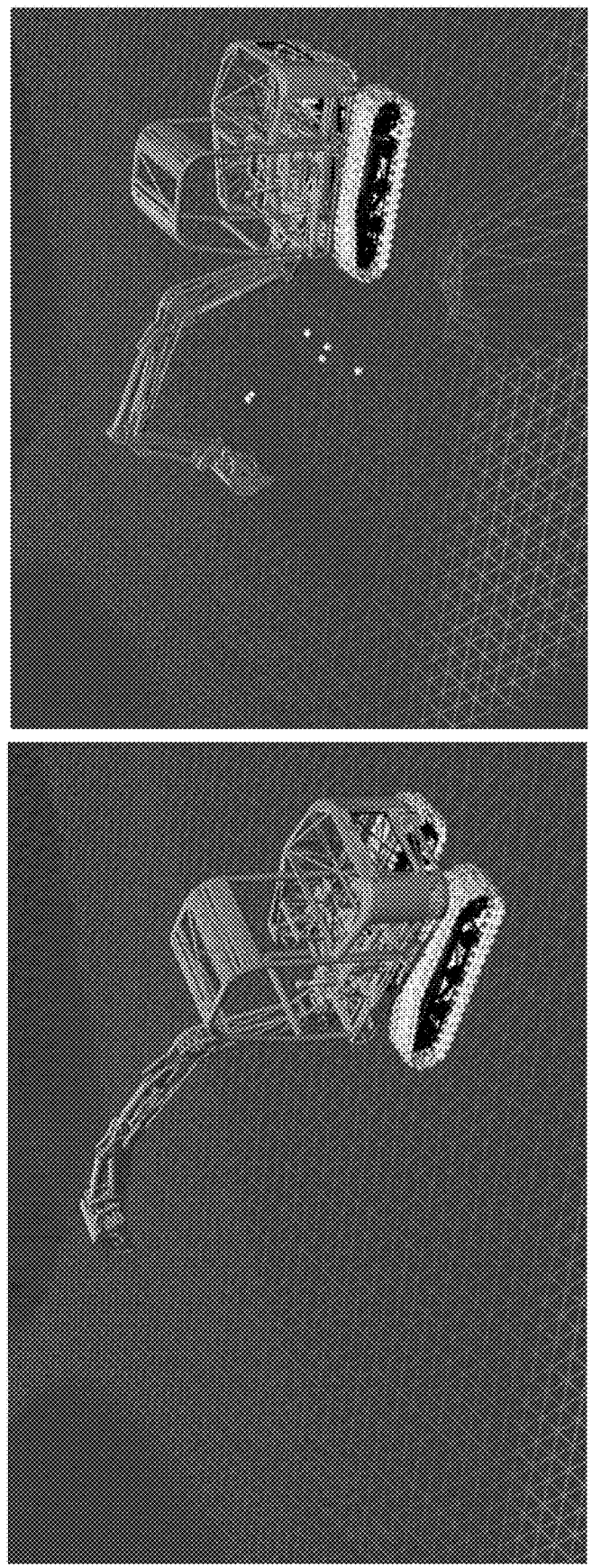
FIG. 9 graphically illustrates simulation result of a trench excavation task, according to embodiments of the present document.
Figure 10:
FIG. 10 depicts simulation result of excavating multiple trenches on a large working area, according to embodiments of the present document.

FIG. 9 and FIG. 10 highlight the experiment results on two excavation scenarios on a real-time 3D simulator. The change of terrain maps is shown during the closed-loop execution of the system at different phases. For the trench excavation scenario shown in FIG. 9, the embodiment of the TaskNet planner generates a plausible task plan of repeating the steps of excavating a tile with multiple digging and dumping operations, and moving the base backward to a desired location. For the example of multiple trenches excavation on a large terrain area shown in FIG. 10, the planner is able to hierarchically decompose the high-level task and compute a feasible task plan with zig-zag covering order. In summary, as shown by these experiment results, embodiments of the TaskNet planner may learn the common excavation task decomposition strategies from the demonstration data to reduce the excavator base movement and ensure the overall excavation efficiency.

F. Sensor Platform Embodiments

Figure 11:
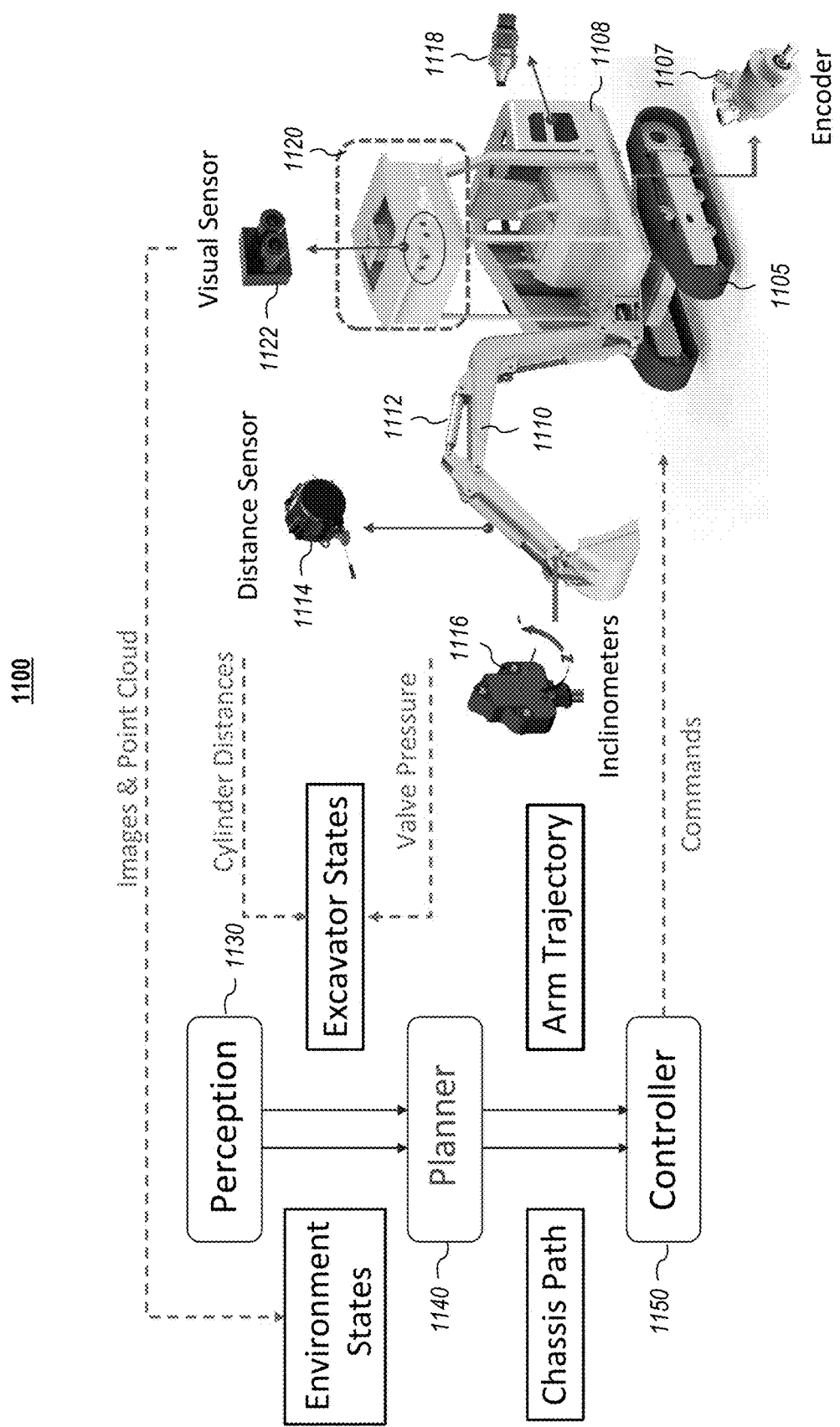
FIG. 11 depicts a platform with various sensors for task planning implementation, according to embodiments of the present document.

FIG. 11 depicts a sensor platform with various sensors for task planning implementation, according to embodiments of the present document. Although FIG. 11 uses an excavator 1105 for example, the implementation and sensor platform in this example may be applicable to other construction, agriculture, or industrial applications or vehicles, such as front loader, backhoe, etc.

As shown in FIG. 11, the excavator 1105 incorporates a plurality of sensors to sense environment and/or excavator states. In one or more embodiments, the plurality of sensors may comprise one or more inclinometers 1116 (e.g. Gefran GIB sensors) to measure the angle of boom, stick and/or bucket of the excavator arm 1110, one or more distance sensors 1114 (e.g. Gefran GSF sensors) to measure travelling distance of the hydraulic cylinders 1112 for enabling boom, stick and/or bucket movement, one or more hydraulic pressure sensors 1118 (e.g. NAGANO-KEIK KM10-1C4 sensors) for the hydraulic cylinders, one or more encoders 1107 (e.g. a LEINE-LINDE ISA608 encoder) to measure the rotation of the cabin 1108. In one or more embodiments, each hydraulic cylinder may have two hydraulic pressure sensors for hydraulic pressure monitoring. In one or more embodiments, the plurality of sensors may further comprise an environment sensor and control pack 1120, which may comprise one or more visual sensors 1122 (e.g. one or more stereo cameras), a GPS or an inertial measurement unit (IMU) sensor, or other UAV sensors used to calculate orientation and velocity of the excavator 1105. In one or more embodiments, the environment sensor and control pack 1120 may incorporate a computer or control board with a memory storing non-transitory computer-readable medium or media comprising one or more sequences of instructions for task planning.

In one or more embodiments, for task implementation, at a perception stage 1130, one or more environment states and one or more excavator states are received. The one or more environment states may be obtained using the plurality sensors in the environment sensor and control pack 1120 and stored as images or point cloud. The one or more excavator states may be obtained using the plurality of sensors, e.g. hydraulic cylinder distance sensors, hydraulic pressure sensors, incorporated in the excavator 1105. Upon receiving the environment states and the excavator states, task planning is implemented in a planner stage 1140. In one or more embodiments, the task planning may be a motion sub-task, e.g. planning a chassis path, or a local execution sub-task, e.g. planning an arm trajectory. The planned sub-task is passed to a controller 1150 for implementation. In one or more embodiments, the controller may output commands to move the chassis of the excavator according to the planned chassis path, or move the arm according to the planned arm trajectory.

G. Some Conclusions

In the present disclosure, embodiments of a novel neural excavation task planner —TaskNet for autonomous vehicle, e.g. excavator, are disclosed. Embodiments of the disclosed neural task planner contain two learning-based neural network models. The first model is a tile excavation model (TEM) designed for learning tile-level excavation strategy, and the second model is a cell excavation model (CEM) designed for determining the suitable cells for excavation. In one or more embodiments, the neural task models were trained using trace generators and implement TaskNet planner using these trained models. The planner is tested with a 3D real-time physically-based terrain and excavator simulator for closed loop execution. The experiment results show that embodiment of the TaskNet planner may effectively learn common task decomposition strategies and may generate plausible task plans for different excavation tasks.

One skilled in the art shall recognize that embodiments herein may be readily adapted or altered for the two neural programming models sharing a core for the both models the such that the two models may eventually be unified and may have better ability of generalization and composition with more tasks, sub-tasks and task primitives. One skilled in the art shall also recognize that embodiments herein may be extended to collect real-world expert operation data and to test on real excavator platform.

H. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 12:
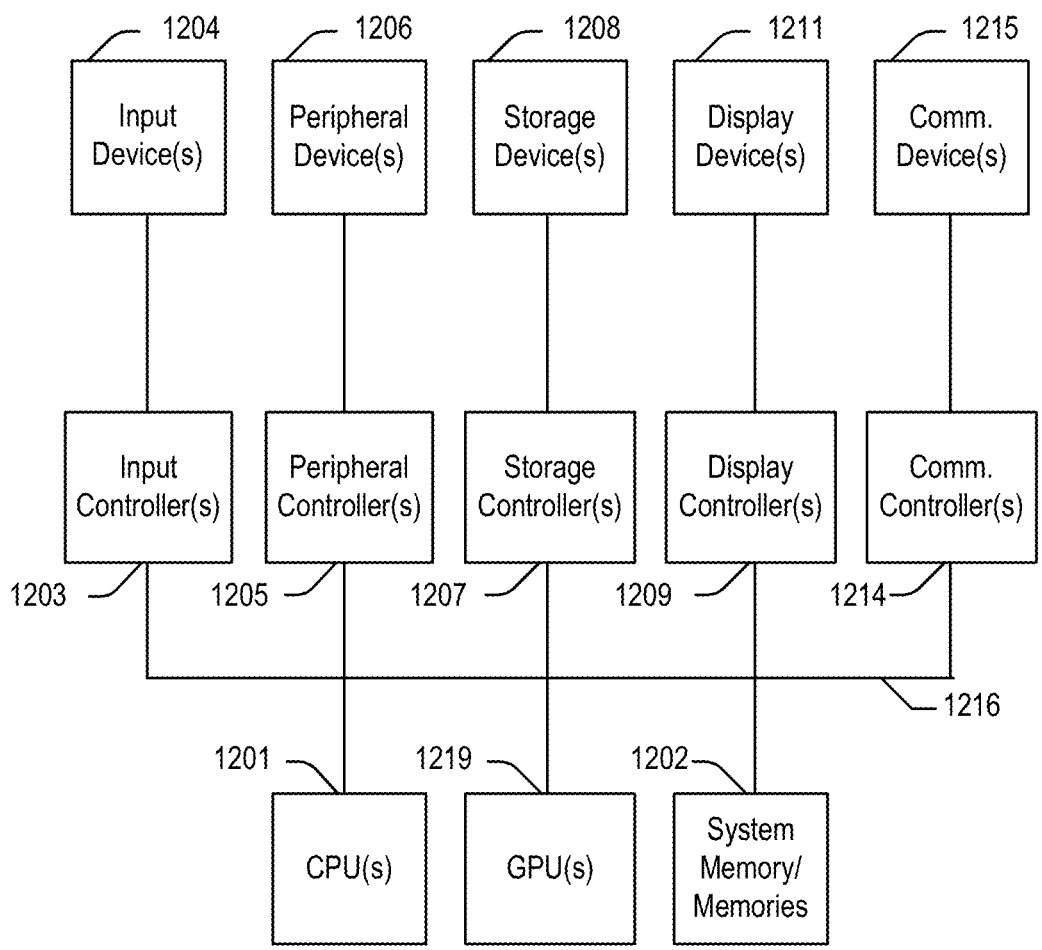
FIG. 12 depicts a simplified block diagram of a computing device/information handling system, in accordance with embodiments of the present document.

FIG. 12 depicts a simplified block diagram of a computing device/information handling system (or computing system) according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

As illustrated in FIG. 12, the computing system 1200 includes one or more central processing units (CPU) 1201 that provides computing resources and controls the computer. CPU 1201 may be implemented with a microprocessor or the like, and may also include one or more graphics processing units (GPU) 1219 and/or a floating-point coprocessor for mathematical computations. System 1200 may also include a system memory 1202, which may be in the form of random-access memory (RAM), read-only memory (ROM), or both.

A number of controllers and peripheral devices may also be provided, as shown in FIG. 12. An input controller 1203 represents an interface to various input device(s) 1204, such as a keyboard, mouse, touchscreen, and/or stylus. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present invention. Storage device(s) 1208 may also be used to store processed data or data to be processed in accordance with the invention. The system 1200 may also include a display controller 1209 for providing an interface to a display device 1211, which may be a cathode ray tube (CRT), a thin film transistor (TFT) display, organic light-emitting diode, electroluminescent panel, plasma panel, or other type of display. The computing system 1200 may also include one or more peripheral controllers or interfaces 1205 for one or more peripherals 1206. Examples of peripherals may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training a task planning network (TPN) for performing a task, the method comprising:
   training a sub-task determining model (SDM) using a sub-task training dataset comprising a first recorded sequence of input-output pairs, wherein each input-output pair has an input comprising environmental observation data and a recorded output for sub-task, the SDM comprises a first planning core, a sub-task decoder, a first specification decoder, and a first termination decoder, the training of the SDM comprising:
      extracting, using the first planning core, features based at least on the environmental observation data;

generating, using the sub-task decoder, a predicated sub-task based at least on the features extracted from the environmental observation data;

generating, using the first specification decoder, a predicated specification corresponding to the predicated sub-task based at least on the features extracted from the environmental observation data;

generating, using the first termination decoder, a first predicated termination status indicating whether the task is completed based at least on the features extracted from the environmental observation data; and training the SDM using a first loss function based on the first recorded sequence of input-output pairs, and the predicated sub-task, the predicated specification and the first predicated termination signal status;

training a primitive determining model (PDM) using a primitive training dataset comprising a second recorded sequence of input-output pairs, wherein each input-output pair has an input comprising local environmental observation data and a recorded output for primitive, the PDM comprises a second planning core, a primitive decoder, a second specification decoder, and a second termination decoder, the training of the PDM comprising:

extracting, using the second planning core, features based at least on the local environmental observation data;

generating, using the primitive decoder, a predicated primitive based at least on the features extracted from the local environmental observation data;

generating, using the second specification decoder, a predicated specification corresponding to the predicated primitive based at least on the features extracted from the local environmental observation data;

generating, using the second termination decoder, a second predicated termination status indicating whether the sub-task is completed; and training the PDM using a second loss function based on the recorded sequence of input-output pairs, and the predicated primitive, the second predicated specification and the second predicated termination status; and generating a trained TPN by combining the trained SDM as a first stage of the TPN and the trained PDM as a second stage of the TPN.

2. The computer-implemented method of claim 1 wherein the TPN further comprises:

a path determining module coupled to the SDM, in responsive to a sub-task output from the SDM being a motion sub-task, the path determining module determines a trajectory for executing the motion sub-task.

3. The computer-implemented method of claim 1 wherein the features extracted from the environmental observation data are latent space representations.

4. The computer-implemented method of claim 1 wherein the first planning core and the second planning core are the same shared by the PDM and the SDM.

5. The computer-implemented method of claim 1 wherein the first loss is a weighted sum of errors between the predicated sub-task, the first predicted specification, the first predicted termination status and corresponding recorded sub-task, recorded specification, recorded termination status in the first recorded sequence of input-output pairs.

6. The computer-implemented method of claim 1 wherein the second loss is a weighted sum of errors between the predicated primitive, the second predicted specification, the second predicted termination status and corresponding recorded sub-task, recorded specification, recorded termination status in the second recorded sequence of input-output pairs.

7. The computer-implemented method of claim 1 wherein the local environmental observation data is chopped from the environmental observation data.

8. A computer-implemented method for performing using a task planning network (TPN), the method comprising:

given at least a task description and an environmental observation, outputting, using a sub-task determining model (SDM), a sub-task, a specification associated with the sub-task, and a task termination status indicating whether the task is completed;

until the task termination status indicates the task is completed, iterating steps comprising:

in response to the sub-task as a motion sub-task for a path in a global frame, invoking a sub-task planning module to generate a trajectory to a target point in the global frame and return to the SDM upon the target point is reached;

in response to the sub-task as a local execution sub-task for local operation, producing, using a primitive determining model (PDM), one or more task primitives based at least on the local execution sub-task and a local environmental observation;

executing the one or more task primitives and updating the local environmental observation and the environmental observation;

returning to the SDM upon completing the local execution sub-task.

9. The computer-implemented method of claim 8 wherein the SDM and the PDM are pre-trained.

10. The computer-implemented method of claim 8 wherein the SDM comprises a first planning core extracting features, given the task, from the environmental observation;

a sub-task decoder coupled to the first planning core, the sub-task decoder generates the sub-task based at least on the features extracted from the environmental observation;

a first specification decoder coupled to the first planning core, the first specification decoder generates a specification corresponding to the sub-task based at least on the features extracted from the environmental observation; and a first termination decoder coupled to the first planning core, the first termination decoder generates the task termination status indicating whether the task is completed.

11. The computer-implemented method of claim 10 wherein the sub-task decoder generates the sub-task based at least on the features extracted from the environmental observation further comprising:

stacking a past sequence of motion direction as a vector with the features extracted from the environmental observation to form a concatenated vector; and feeding the concatenated vector to one or more full-connected connected layers in the sub-task decoder to generate the sub-task.

12. The computer-implemented method of claim 10 wherein the PDM comprises a second planning core extracting, given the sub-task output from the SDM, features using an input comprising at least the local environmental observation;

a primitive decoder coupled to the second planning core, the primitive decoder generates the primitive based at least on the features extracted from the local environmental observation;

a second specification decoder coupled to the second planning core, the first second specification decoder generates a specification corresponding to the primitive based at least on the features extracted from the local environmental observation; and a second termination decoder coupled to the second planning core, the second termination decoder generates a sub-task termination status indicating whether the sub-task is completed.

13. The computer-implemented method of claim 12 wherein the input to the second planning core further comprises specification associated with a last task primitive.

14. The computer-implemented method of claim 12 wherein the first planning core and the second planning core are the same shared by the PDM and the SDM.

15. The computer-implemented method of claim 12 wherein the local environmental observation is chopped from the environmental observation data.

16. A computer-implemented method for performing task planning using a task planning network (TPN), the method comprising:

inputting environmental observation data and a task into a trained TPN, the trained TPN comprising:
a sub-task determining model (SDM) comprising:
a first planning core extracting, given the task, features from the environmental observation data;
a sub-task decoder coupled to the first planning core, the sub-task decoder generates at least one sub-task based at least on the features extracted from the environmental observation data;
a first specification decoder coupled to the first planning core, the first specification decoder generates a specification corresponding to the at least one sub-task based at least on the features extracted from the environmental observation data; and
a first termination decoder coupled to the first planning core, the first termination decoder generates a task termination status indicating whether the task is completed based at least on the environmental observation data;
a primitive determining model (PDM) comprising:

a second planning core extracting features, in response to one sub-task output from the SDM being a local execution sub-task for local operation, using an input comprising at least local environmental observation data associated with the local execution sub-task;

a primitive decoder coupled to the second planning core, the primitive decoder generates one or more primitives based at least on the local execution sub-task and the features extracted from the local environmental observation data;

a second specification decoder coupled to the second planning core, the second specification decoder generates a specification corresponding to the one or more primitives based at least on the features extracted from the local environmental observation data; and a second termination decoder coupled to the second planning core, the second termination decoder generates a sub-task termination status indicating whether the local execution sub-task is completed;

updating the local environmental observation data and the environmental observation data when the one or more primitives are executed; and terminating the task planning by the SDM when the task termination status indicating that the task is completed.

17. The computer-implemented method of claim 16 wherein the input to the second planning core further comprises specification associated with a last task primitive.

18. The computer-implemented method of claim 16 wherein the local environmental observation data is chopped from the environmental observation data.

19. The computer-implemented method of claim 16 wherein the sub-task decoder generates the sub-task based at least on the features extracted from the environmental observation data further comprising:

stacking past sequence of motion direction as a vector with the features extracted from the environmental observation data to form a concatenated vector; and feeding the concatenated vector to one or more full-connected connected layers in the sub-task decoder to generate the sub-task.

20. The computer-implemented method of claim 16 wherein the input to the second planning core further comprises specification associated with a last task primitive.

* * * * *